United States Patent

Obata et al.

[11] Patent Number: 5,818,804
[45] Date of Patent: Oct. 6, 1998

[54] DEFECT DETECTING CIRCUIT AND REPRODUCING APPARATUS HAVING THE DEFECT DETECTING CIRCUIT

[75] Inventors: Hideo Obata; Kazuhiko Fujiie, both of Kanagawa; Ryo Ando, Tokyo, all of Japan

[73] Assignee: Sony Corporation, Tokyo, Japan

[21] Appl. No.: 840,826

[22] Filed: Apr. 16, 1997

[30] Foreign Application Priority Data

Apr. 23, 1996 [JP] Japan ................................ 8-126357

[51] Int. Cl.⁶ ............................................. G11B 7/09
[52] U.S. Cl. ........................... 369/44.32; 369/54; 369/58
[58] Field of Search ............................ 369/44.28, 44.25, 369/44.29, 44.35, 54, 58

[56] References Cited

U.S. PATENT DOCUMENTS

| | | | |
|---|---|---|---|
| 4,817,077 | 3/1989 | Ono | 369/44.32 |
| 5,027,339 | 6/1991 | Yoda et al. | 369/54 |
| 5,357,497 | 10/1994 | Ogawa | 369/58 |
| 5,497,361 | 3/1996 | Mita et al. | 369/58 |

*Primary Examiner*—Thang V. Tran
*Attorney, Agent, or Firm*—Jay H. Maioli

[57] ABSTRACT

A defect detecting apparatus and a reproducing apparatus therewith are disclosed, the defect detecting apparatus includes a detector for detecting a first type of defect such as a black dot that takes place in a fabrication stage and a second type of defect such as fingerprints that adheres on an optical disc and a controller for controlling various servo signals corresponding to the detected result.

12 Claims, 8 Drawing Sheets

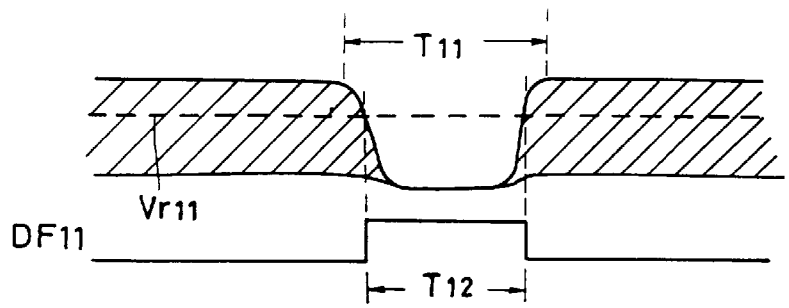
Fig. 4A PRIOR ART
Fig. 4B PRIOR ART
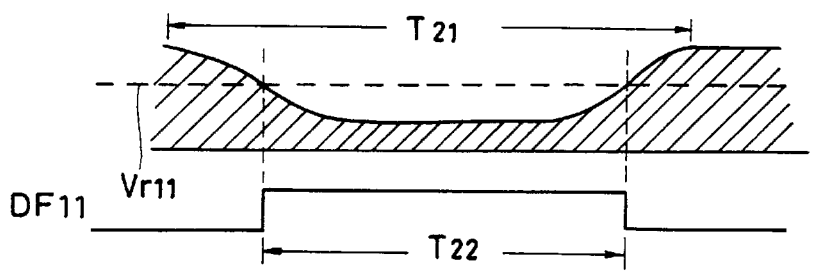
Fig. 5A PRIOR ART
Fig. 5B PRIOR ART
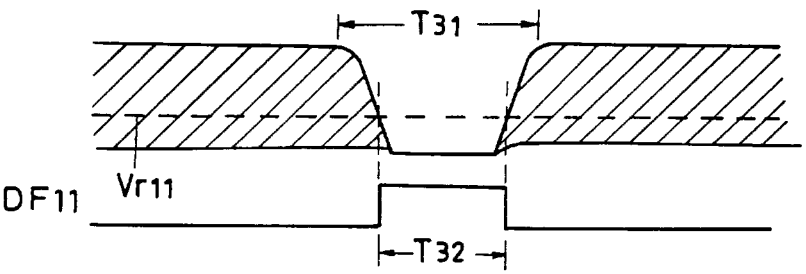
Fig. 6A PRIOR ART
Fig. 6B PRIOR ART
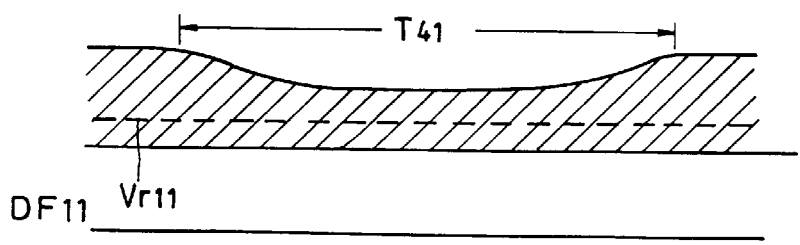
Fig. 7A PRIOR ART
Fig. 7B PRIOR ART

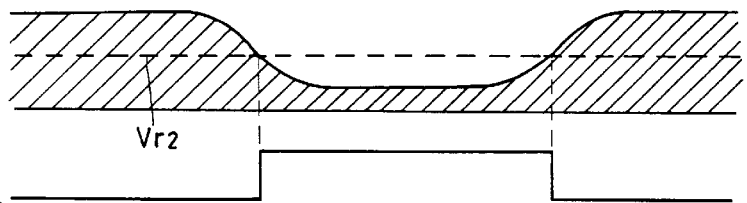
Fig. 10A
Fig. 10B OUTPUT SIGNAL OF CMP 23
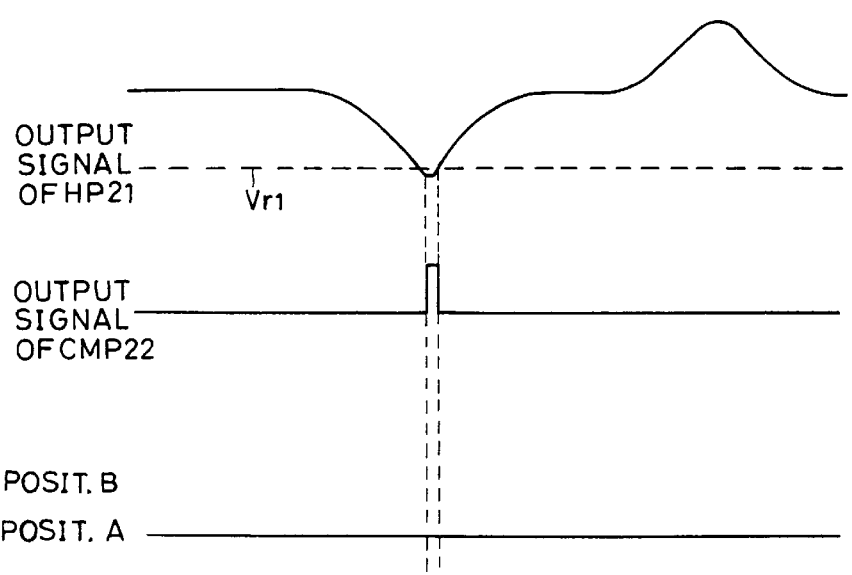
Fig. 10C OUTPUT SIGNAL OF HP21
Fig. 10D OUTPUT SIGNAL OF CMP22
Fig. 10E POSIT. B / POSIT. A
Fig. 10F DF1

DEFECT DETECTING CIRCUIT AND REPRODUCING APPARATUS HAVING THE DEFECT DETECTING CIRCUIT

BACKGROUND OF THE INVENTION

1. Field of the Invention

The present invention relates to a defect detecting circuit for detecting whether or not a defect due to rubbish or fingerprints that adheres on a disc and a reproducing apparatus therewith.

2. Description of the Related Art

When rubbish or fingerprints adhere on an optical disc on which a digital/audio signal has been recorded, a disc defect may take place. When the disc defect takes place, a tracking servo circuit and a focus servo circuit may not correctly operate. To solve this problem, a conventional optical disc reproducing apparatus has a defect detecting circuit that detects a defect of a disc. Corresponding to an output signal of the defect detecting circuit, the tracking servo circuit and the focus servo circuit are controlled.

In FIG. 1, reference numeral 101 is a six-segmented detector. The six-segmented detector 101 is composed of six detectors 101A, 101B, 101C, 101D, 101E, and 101F. A beam of light radiated from a laser diode of an optical pickup (not shown) is reflected by an optical disc and focused to the six-segmented detector 101 through an objective lens. Output signals of the detectors 101A and 101B are supplied to an adder 102. Output signals of the detectors 101C and 101D are supplied to an adder 103. Output signals of the adders 102 and 103 are supplied to both an adder 104 and a subtracter 105. The adder 102 outputs a reproduction signal RF of the disc. The subtracter 103 outputs a focus error signal FE. Output signals of the detectors 110E and 101F are supplied to a subtracter 106. The subtracter 106 outputs a tracking error signal TE.

The focus error signal FE that is output from the subtracter 105 is supplied to a gain adjusting circuit 107. The gain adjusting circuit 107 adjusts the gain. An output signal of the gain adjusting circuit 107 is supplied to both a terminal 109A of a switch circuit 109 and a terminal 109B of the switch circuit 109 through a hold circuit 108. The hold circuit 108 holds the focus error signal FE. An output signal of the switch circuit 109 is supplied to a focus coil 112 through a phase equalizer 110 and a drive amplifier 111. The focus coil 112 moves the objective lens of the optical pickup upwardly and downwardly.

The tracking error signal TE that is output from the subtracter 106 is supplied to a gain adjusting circuit 114. The gain adjusting circuit 114 adjusts the gain of the tracking error signal TE. An output signal of the gain adjusting circuit 114 is supplied to both a terminal 116A of the switch circuit 116 and a terminal 116B of the switch circuit 116 through a hold circuit 115. The hold circuit 115 holds the tracking error signal TE. An output signal of the switch circuit 116 is supplied to a tracking coil 119 through a phase equalizer 117 and a drive amplifier 118. The tracking circuit 119 moves the objective lens of the optical pickup in the tracking direction.

The reproduction signal RF that is output from the adder 104 is supplied as an EFM (Eight-Fifteen Modulation) signal. In addition, the reproduction signal RF is supplied to an envelop detecting circuit 120. The envelop detecting circuit 120 detects an envelop level of the reproduction signal RF. An output signal of the envelop detecting circuit 120 is supplied to a comparator 121. The comparator 121 compares the envelop level of the reproduction signal with a reference level $V_{r11}$. The comparator 121 outputs a defect signal DF11. The detect signal DF11 is supplied as a switch control signal to the switches 109 and 116.

When the disc has no detect, the envelop level of the reproduction signal is higher than the reference level $V_{r11}$. Thus, the signal level of the output signal of the comparator 11 becomes low. When the signal level of the output signal of the comparator 121 is low, the switch circuit 109 is placed in the terminal 109A position. When the switch circuit 109 is placed in the terminal 109A position, the focus error signal FE that is output from the subtracter 105 is supplied to the focus coil 112 through the gain adjusting circuit 107, the switch circuit 109, the phase equalizer 110, and the drive amplifier 111. Thus, since the focus servo loop is turned on, the focus coil 112 is driven corresponding to the focus error signal FE that is output from the subtracter 105.

In addition, when the switch circuit 116 is placed in the terminal 116A position, the tracking error signal TE that is output from the subtracter 106 is supplied to the tracking coil 119 through the gain adjusting circuit 114, the switch circuit 116, the phase equalizer 117, and the drive amplifier 118. Thus, since the tracking servo loop is turned on, the tracking coil 119 is driven corresponding to the tracking error signal TE that is output from the subtracter 106.

When a disc defect due to rubbish or a fingerprint that adheres on the disc takes place, the signal level of the reproduction signal decreases. Thus, the signal level of the defect signal DF11 that is output from the comparator 121 becomes high. The defect signal DF11 causes the switch circuit 109 to be placed in the terminal 109B position and the switch circuit 116 to be placed in the terminal 116B position. When the switch circuit 109 is placed in the terminal position 109B, the focus error signal held in the hold circuit 108 is supplied to the focus coil 113 through the switch circuit 109, the phase equalizer 110, and the drive amplifier 111.

When the switch circuit 116 is placed in the terminal 116B position, the tracking error signal held in the hold circuit 115 is supplied to the tracking coil 119 through the switch circuit 116, the phase equalizer 117, and the drive amplifier 118.

Such a defect detecting circuit has been disclosed in for example U.S. Pat. Ser. No. 4,817,077.

As shown in FIG. 2, defects on the disc can be categorized as two types. In the case of the first type defect, reflected light is not obtained at all as with rubbish that adheres on a disc 151. The first type defect is denoted by the defect 152. In the case of the second type defect, reflected light gradually weakens in a wide range as with the fingerprint that adheres on the disc 152. The second type of defect is denoted by the defect 153.

In the case of the defect 152, as shown in FIG. 3A, the signal level of the reproduction signal sharply decreases in a short time period. In the case of the defect 153, as shown in FIG. 3B, the signal level of the reproduction signal of the disc gradually decreases for a long time period. However, in this case, the reproduction signal can be obtained in the period to some extent.

When reflected light is not obtained at all as with the defect 152, since the focus error signal and the tracking error signal cannot be obtained at all, the focus servo loop and the tracking servo loop should be turned off. However, when reflected light weakens in a wide range as with the defect 153, since the focus servo signal and the tracking error signal are obtained to some extent, it is preferred to keep the focus servo loop and the tracking servo loop in the on state.

The above-described conventional disc reproducing apparatus detects envelop level of the reproduction signal of the disc and determines whether the envelop level is a predetermined level or higher so as to detect a disc defect. Thus, in addition to the case of the first type defect of which reflected light is not obtained at all as with the defect 152, in the case of the second type defect of which reflected light gradually weakens in a wide range as with the case of the defect 153, the focus servo loop and the tracking servo loop are turned off.

In the defect detecting circuit of the conventional disc reproducing apparatus, the comparator 121 compares the envelop level of the reproduction signal of the disc with the reference level $V_{r11}$. When a defect of which reflected light is not obtained at all has taken place as with the defect 152, as shown in FIG. 4A, the signal level of the reproduction signal sharply decreases at a period $T_{11}$ of the defect. Thus, in a period $T_{12}$, the envelop level of the reproduction signal becomes lower than the reference level $V_{r11}$. As shown in FIG. 4B, the signal level of the defect signal DF11 becomes high in the period $T_{12}$.

When a defect of which reflected light gradually weakens in a wide range as with the defect 153, as shown in FIG. 5A, the signal level of the reproduction signal gradually decreases in the period $T_{21}$ of the defect. Thus, in the period $T_{22}$, the envelop level of the reproduction signal becomes lower than the reference level $V_{r1}$. As shown in FIG. 5B, the signal level of the defect signal DF11 becomes high in the period $T_{22}$.

Thus, in the conventional disc reproducing apparatus, in addition to the case of the first type defect of which reflected light is not obtained at all as with the defect 152, in the case of the second type defect of which reflected light gradually weakens in a wide range as with the defect 153, the focus servo loop and the tracking servo loop are turned off. To solve this problem, the reference level $V_{r11}$ of the comparator 121 may be decreased only when reflected light is not obtained at all as with the defect 152.

When the reference level $V_{r11}$ of the comparator 121 is decreased, if a defect of which reflected light is not obtained at all as with the defect 152 has taken place, as shown in FIG. 6B, the signal level of the defect signal DF11 becomes high in the period $T_{32}$ of which the envelop level of the reproduction signal is lower than the reference level $V_{r11}$. On the other hand, when a defect of which reflected light gradually weakens in a wide range as with the defect 153, since the envelop level of the reproduction signal does not become lower than the reference level $V_{r11}$, as shown in FIG. 7B, the defect signal DF11 is not output in the period $T_{41}$ of which a defect has taken place.

However, when the reference level $V_{r11}$ is decreased, the detecting sensitivity of a defect decreases. Thus, as shown in FIGS. 6A and 6B, in the case of the first type defect of which reflected light is not obtained at all as with the defect 152, the period $T_{32}$ of the defect signal becomes shorter than the period $T_{31}$ of which the defect has taken place.

To detect whether or not the envelop level sharply varies, the defect signal may be output depending on whether the envelop level of the reproduction signal that has been band-limited by a high-pass filter is a predetermined value or higher. However, in this method, only edge portions of the envelop level of the reproduction signal are detected. The other portions of the envelop level are not detected. Thus, the defect signal does not accord with the real defect portion.

OBJECTS AND SUMMARY OF THE INVENTION

Therefore, an object of the present invention is to provide a defect detecting circuit that can detect a defect of which reflected light is not obtained at all and a defect of which reflected light weakens in a wide range without a decrease of the detecting sensitivity.

Another object of the present invention is to provide a reproducing apparatus having such a defect detecting circuit.

A first aspect of the present invention is a defect detecting circuit for radiating light to an optical record medium and detecting a defect of a reproduction signal generated corresponding to light reflected from the optical record medium, having a first comparator for comparing the level of the reproduction signal with a first predetermined value, a high-pass filter for extracting a high frequency component from the reproduction signal, a second comparator for comparing the high frequency component extracted by said high-pass filter with a second predetermined value, a time width detector for detecting a time width of the compared result of said second comparator, and a switcher for selecting the compared result of said first comparator or the compared result of said second comparator.

A second aspect of the present invention is a defect detecting circuit for radiating light to an optical record medium and detecting a defect of a reproduction signal generated corresponding to light reflected from the optical record medium, having a first comparator for comparing the level of the reproduction signal with a first predetermined value, a first detector for detecting an envelop of the reproduction signal with a long time constant, a second detector for detecting an envelop of the reproduction signal with a shorter time constant than the long time constant, a level shifter for shifting the level of an output signal of said first detector, a second comparator for comparing an output signal of said level shifter with an output signal of said second detector, a time width detector for detecting a time width of the compared result of said second comparator, and a switcher for selecting the compared result of said first comparator or the compared result of said second comparator corresponding to an output signal of said time width detector.

A third aspect of the present invention is a reproducing apparatus, having a reproduction signal generator for radiating light to an optical record medium and generating a reproduction signal corresponding to light reflected from the optical record medium, a first comparator for comparing the level of the reproduction signal generated by said reproduction signal generator with a first predetermined value, a high-pass filter for extracting a high frequency component from the reproduction signal, a second comparator for comparing the high frequency component extracted by said high-pass filter with a second predetermined value, a time width detector for detecting a time width of the compared result of said second comparator, a switcher for selecting the compared result of said first comparator or the compared result of said second comparator, and a controller for controlling various servo loops corresponding to an output signal of said switcher.

A fourth aspect of the present invention is a reproducing apparatus, having a reproduction signal generator for radiating light to an optical record medium and generating a reproduction signal corresponding to light reflected from the optical record medium, a first comparator for comparing the level of the reproduction signal generated by said reproduction generator with a first predetermined value, a first detector for detecting an envelop of the reproduction signal generated by said reproduction generator with a long time constant, a second detector for detecting an envelop of the reproduction signal generated by said reproduction generator with a shorter time constant than the long time constant, a level shifter for shifting the level of an output signal of said first detector, a second comparator for comparing an output signal of said level shifter with an output signal of said second detector, a time width detector for detecting a time width of the compared result of said second comparator, a switcher for selecting the compared result of said first comparator or the compared result of said second comparator corresponding to an output signal of said time width detector, and a controller for controlling various servo loops corresponding to an output signal of said switcher.

These and other objects, features and advantages of the present invention will become more apparent in light of the following detailed description of best mode embodiments thereof, as illustrated in the accompanying drawings.

BRIEF DESCRIPTION OF THE DRAWINGS

FIG. 4A is a schematic diagram showing a damage of a reproduction signal due to a fabrication defect of a disc or a defect as scratch or rubbish on the disc;

FIG. 4B is a schematic diagram showing a defect detection signal of which a reproduction signal is sliced in a high threshold level;

FIG. 5A is a schematic diagram showing a damage of a reproduction signal due to fingerprint that adheres on the disc;

FIG. 5B is a schematic diagram showing a defect detection signal of which a reproduction signal is sliced in a high threshold level;

FIG. 6A is a schematic diagram showing a damage of a reproduction signal due to a fabrication defect of a disc or a defect as a scratch or rubbish on the disc;

FIG. 6B is a schematic diagram showing a defect detection signal of which a reproduction signal is sliced in a high threshold level;

FIG. 7A is a schematic diagram showing a damage of a reproduction signal due to fingerprint that adheres on the disc;

FIG. 7B is a schematic diagram showing a defect detection signal of which a reproduction signal is sliced in a high threshold level;

FIG. 10A is a schematic diagram showing a damage of a reproduction signal due to a fabrication defect of a disc or a defect as a scratch or rubbish on the disc;

FIG. 10B is a schematic diagram showing an output signal of a comparator CMP 23 of which a reproduction signal damaged due to fingerprint on the disc is sliced in a threshold level $V_{r2}$;

FIG. 10C is a schematic diagram showing an output signal of a high-pass filter HPF 21 to which the reproduction signal is supplied;

FIG. 10D is a schematic diagram showing an output signal of the comparator CMP 22 of which the output signal of the high-pass filter 21 is sliced in a threshold level $V_{r1}$;

FIG. 10E is a schematic diagram showing a control signal of a switch circuit 24 generated corresponding to a determined result of a pulse width detecting circuit 25 of whether the width of the output signal of the comparator CMP 22 is a time period τ or longer;

FIG. 10F is a schematic diagram showing a defect detection signal DF1 that is output from the switch circuit 24;

DETAILED DESCRIPTION OF THE PREFERRED EMBODIMENTS

Figure 8:
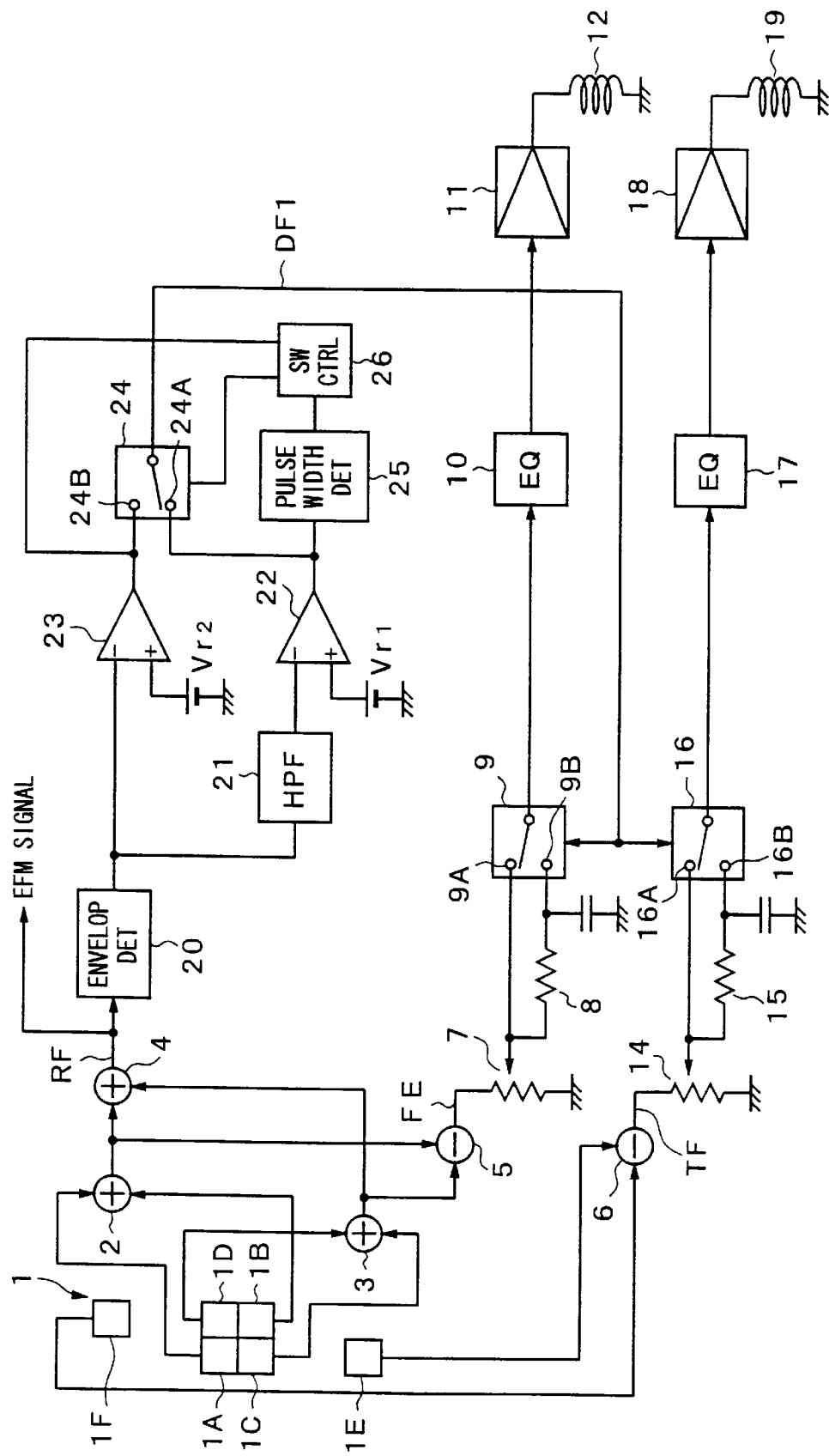
FIG. 8 is a block diagram showing the structure of a defect detecting circuit according to a first embodiment of the present invention.

Next with reference to the accompanying drawings, embodiments of the present invention will be described. FIG. 8 shows the structure of a disc reproducing apparatus according to the present invention. In FIG. 8, reference numeral 1 is an six-segmented detector. The six-segmented detector 1 is composed of six detectors 1A, 1B, 1C, 1D, 1E, and 1F. A beam of light radiated from a laser diode of an optical pickup (not shown) is reflected by an optical disc and focused to the six-segmented detector 1 through an objective lens. Output signals of the detectors 1A and 1B are supplied to an adder 2.

Output signals of the detectors 1C and 1D are supplied to an adder 3. Output signals of the adders 2 and 3 are supplied to both an adder 4 and a subtracter 5. The adder 2 outputs a reproduction signal RF of the disc. The subtracter 3 outputs a focus error signal FE. Output signals of the detectors 1E and 1F are supplied to a subtracter 6. The subtracter 6 outputs a tracking error signal TE.

The focus error signal FE that is output from the subtracter 5 is supplied to a gain adjusting circuit 7. The gain adjusting circuit 7 adjusts the gain. An output signal of the gain adjusting circuit 7 is supplied to both a terminal 9A of a switch circuit 9 and a terminal 9B of the switch circuit 9 through a hold circuit 8. The hold circuit 8 holds the focus error signal FE. An output signal of the switch circuit 9 is supplied to a focus coil 12 through a phase equalizer 10 and a drive amplifier 11. The focus coil 12 moves the objective lens of the optical pickup upwardly and downwardly.

The tracking error signal TE that is output from the subtracter 6 is supplied to a gain adjusting circuit 14. The gain adjusting circuit 14 adjusts the gain of the tracking error signal TE. An output signal of the gain adjusting circuit 14 is supplied to both a terminal 16A of the switch circuit 16 and a terminal 16B of the switch circuit 16 through a hold circuit 15. The hold circuit 15 holds the tracking error signal TE. An output signal of the switch circuit 16 is supplied to a tracking coil 19 through a phase equalizer 17 and a drive amplifier 18. The tracking circuit 19 moves the objective lens of the optical pickup in the tracking direction.

The adder 4 outputs the reproduction signal as an EFM signal. In addition, the adder 4 supplies the reproduction signal RF to an envelop detecting circuit 20. The envelop detecting circuit 20 detects an envelop level of the reproduction signal RF. An output signal of the envelop detecting circuit 20 is supplied to both a comparator 23 and a comparator 22 through a high-pass filter 21. The comparator 22 compares the envelop level of the reproduction signal received from the high-pass filter 21 and a reference level $V_{r1}$. The comparator 23 compares the envelop level of the reproduction signal and a reference level $V_{r2}$.

An output signal of the comparator 22 is supplied to both a terminal 24A of a switch circuit 24 and a pulse width detecting circuit 25. The pulse width detecting circuit 25 detects whether or not the pulse width of a pulse that is output from the comparator 22 is a predetermined value or larger. An output signal of the pulse width detecting circuit 25 is supplied to a switch controlling circuit 26. An output signal of the switch controlling circuit 26 is supplied as a switch control signal to a switch circuit 24. An output signal of the comparator 23 is supplied to both a terminal 24B of a switch circuit 24 and a switch controlling circuit 26.

In the normal state, the switch circuit 24 is placed in the terminal 24A position. When the pulse width detecting circuit 25 has detected that the pulse width of the pulse that is output from the comparator 22 is the predetermined value or larger, the switch circuit 24 is placed in the terminal 24B position. The switch circuit 24 outputs a defect signal DF1. The defect signal DF1 is supplied as a switch control signal to both switch circuits 9 and 16.

When the signal level of the defect signal DF1 that is output from the switch circuit 24 is low, the switch circuit 9 is placed in the terminal 9A position. At this point, the switch circuit 16 is placed in the terminal 16A position. When the switch circuit 9 is placed in the terminal 9A position, the focus error signal FE that is output from the subtracter 5 is supplied to the focus coil 12 through the gain adjusting circuit 7, the switch circuit 9, the phase equalizer 10, and the drive amplifier 11. Thus, the focus coil 12 is driven corresponding to the focus error signal FE that is output from the subtracter 7.

When the switch circuit 16 is placed in the terminal 16A position, the tracking error signal TE that is output from the subtracter 6 is supplied to the tracking coil 19 through the gain adjusting circuit 14, the switch circuit 16, the phase equalizer 17, and the drive amplifier 18. Thus, the tracking coil 19 is driven corresponding to the tracking error signal TE that is output from the subtracter 6.

When the signal level of the defect signal DF1 that is output from the switch circuit 24 becomes high, the switch circuit 9 is placed in the terminal 9B position. The switch circuit 16 is placed in the terminal 16B position. When the switch circuit 9 is placed in the terminal 9B position, the focus serve loop is turned off. At this point, the focus error signal FE is supplied to the focus coil 12 through the switch circuit 9, the phase equalizer 10, and the drive amplifier 11.

When the switch circuit 16 is placed in the terminal 16B position, the tracking servo loop is turned off. The tracking error signal held in the hold circuit 15 is supplied to the tracking coil 19 through the switch circuit 16, the phase equalizer 17, and the drive amplifier 18.

In the disc reproducing apparatus according to the present invention, the comparator 22 compares the envelop level of the output signal of the high-pass filter 21 to which the reproduction signal of the disc is supplied with the reference level $V_{r1}$. The comparator 23 compares the envelop level of the reproduction signal of the disc with the reference level $V_{r2}$. One of output signals of the comparators 22 and 23 is selected corresponding to an output signal of the pulse width detecting circuit 25 so as to output the defect signal DF1.

Figure 1:
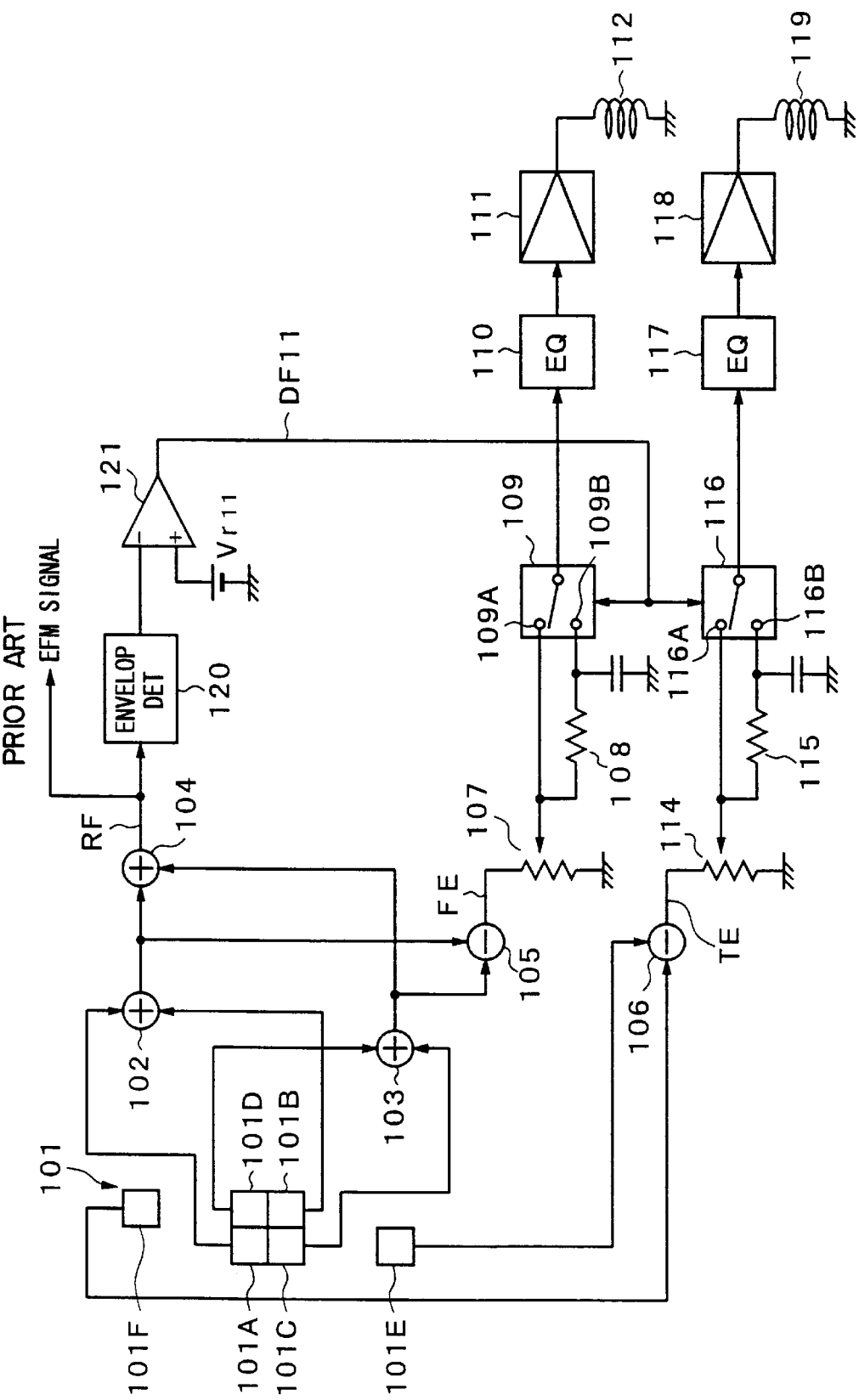
FIG. 1 is a block diagram showing the structure of a reproducing circuit having a conventional defect detecting circuit.
Figure 2:
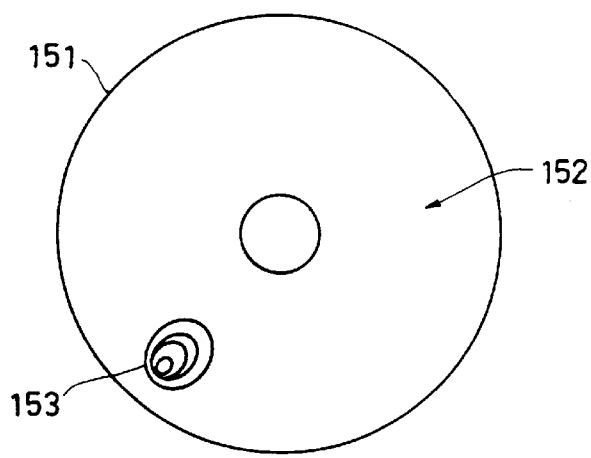
FIG. 2 is a schematic diagram for explaining types of defects that may take place on a disc.
Figure 3A:
FIG. 3A is a schematic diagram showing a damage of a reproduction signal due to a fabrication defect of a disc or a defect as a scratch or rubbish on the disc.
Figure 3B:
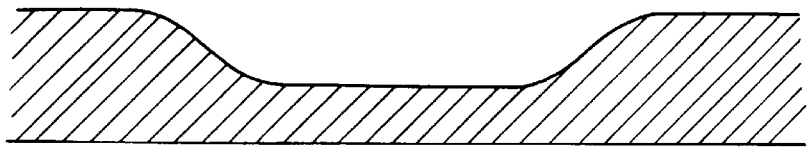
FIG. 3B is a schematic diagram showing a damage of a reproduction signal due to fingerprint that adheres on the disc.

Thus, defects can be categorized as a first type of which reflected light is not obtained at all (as with the defect 152 shown in FIG. 2) and a second type of which reflected light weakens in a wide range (as with the defect 153 shown in FIG. 2). In the case of the first type defect, the defect signal DF1 can be output.

In the case of the first type defect of which reflected light is not obtained at all, the envelop level of the reproduction signal sharply varies. On the other hand, in the case of the second type defect, the envelop level gradually varies. From a frequency point view, in the case of the first type defect, edge portions of the envelop of the reproduction signal contain many high frequency components. On the other hand, in the case of the second type defect, edge portions of the reproduction signal do not contain many high frequency components.

Thus, the first type defect and the second type defect can be isolated with a high-pass filter from a frequency point of view. Consequently, the disc reproducing apparatus according to the present invention is provided with the high-pass filter 21. The comparator 22 detects whether the envelop level of the reproduction signal received from the high-pass filter 21 is the predetermined value or larger. In the normal state, the switch circuit 24 is placed in the terminal 24A position. The comparator 22 outputs the defect signal DF1. The pulse width detecting circuit 25 detects whether the pulse width of the pulse that is output from the comparator 22 is the predetermined value or larger. When the output signal of the high-pass filter 21 is the predetermined value or larger, the switch circuit 24 is placed in the terminal 24B position. The detection output signal that represents whether the envelop level of the reproduction signal is the predetermined value or larger is output as the defect signal DF1. Thus, in the case of the first type defect of which reflected right is not obtained at all, the defect signal is output corresponding to the defect portion.

Figure 9A:
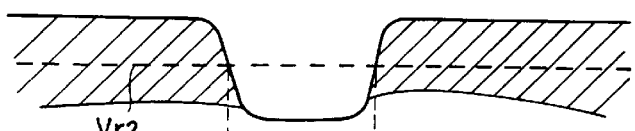
FIG. 9A is a schematic diagram showing a damage of a reproduction signal due to a fabrication defect of a disc or a defect as a scratch or rubbish on the disc.
Figure 9B:
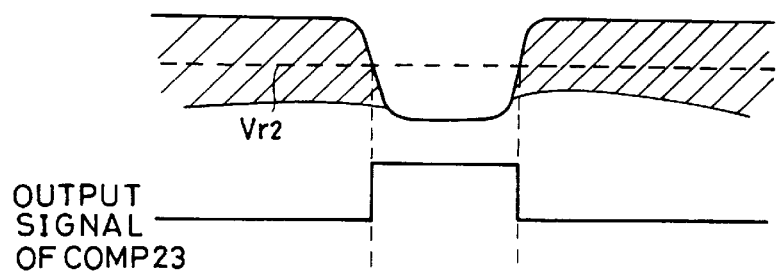
FIG. 9B is a schematic diagram showing an output signal of a comparator CMP 23 of which a reproduction signal damaged due to a fabrication defect of a disc or a defect as a scratch or rubbish on the disc is sliced in a threshold level $V_{r2}$.
Figure 9C:
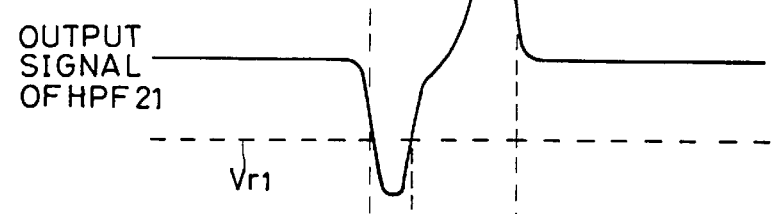
FIG. 9C is a schematic diagram showing an output signal of a high-pass filter HPF 21 to which the reproduction signal is supplied.

FIGS. 9A to 9F show waveforms of individual portions of the defect detecting circuit in the case of the first type defect of which reflected light is not obtained at all. When the first type defect has taken place, as shown in FIG. 9A, the signal level of the reproduction signal sharply varies. The resultant signal is supplied to the high-pass filter 21. The high-pass filter 21 extracts the high frequency components. In this case, since the envelop level of the reproduction signal sharply varies, the edge portions contain many high frequency components. As shown in FIG. 9C, the signal level of the output signal of the high-pass filter 21 outputs becomes large at the edge portions.

The comparator 23 compares the envelop level of the reproduction signal shown in FIG. 9A with the reference level $V_{r2}$. Thus, the comparator 23 outputs a signal as shown in FIG. 9B.

The comparator 22 compares the high frequency components of the envelop level of the reproduction signal received from the high-pass filter 21 with the reference level $V_{r1}$. In the case of the first type defect of which reflected light is not obtained at all, as shown in FIG. 9C, since the signal level of the output signal of the high-pass filter 21 becomes large at edge portions, the comparator 22 outputs a pulse in a period from time $t_1$ to $t_2$.

Figure 9D:
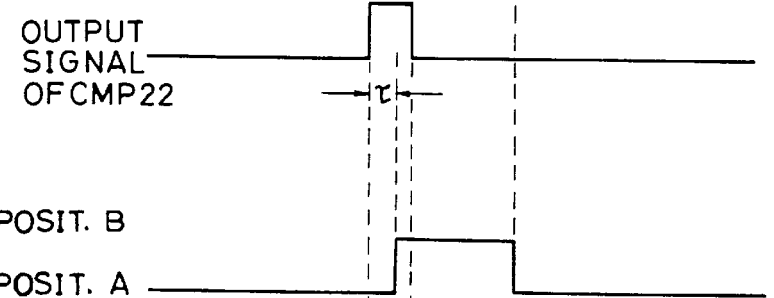
FIG. 9D is a schematic diagram showing an output signal of a comparator CMP 22 of which the output signal of the high-pass filter 21 is sliced in a threshold level $V_{r1}$.
Figure 9E:
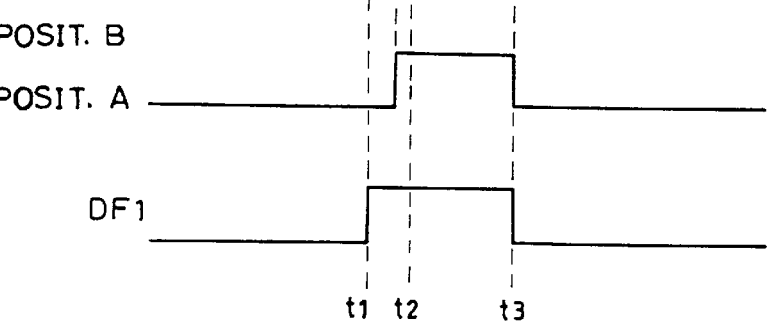
FIG. 9E is a schematic diagram showing a control signal of a switch circuit 24 generated corresponding to a determined result of a pulse width detecting circuit 25 of whether the width of the output signal of the comparator CMP 22 is a time period τ or longer.

As shown in FIG. 9E, in the initial state, the switch circuit 24 is placed in the terminal 24A position. The pulse width detecting circuit 25 detects a pulse width of the pulse that is output from the comparator 22. When the pulse width is the predetermined pulse width $\tau$ or larger, the switch circuit 24 is placed in the terminal 24B position. In the case of the first type defect of which reflected light is not obtained at all, as shown in FIG. 9D, the pulse width of the pulse that is output from the comparator 22 becomes the predetermined pulse width $\tau$ or larger. Thus, as shown in FIG. 9E, after the pulse width of the pulse that is output from the comparator 22 has become the predetermined pulse value $\tau$ or larger, the switch circuit 24 is placed in the terminal 24B position.

Figure 9F:
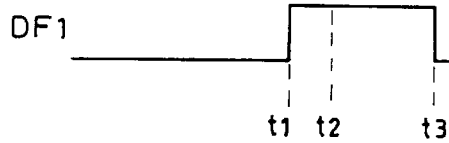
FIG. 9F is a schematic diagram showing a defect detection signal DF1 that is output from the switch circuit 24.

When the switch circuit 24 is placed in the terminal 24A position, the switch circuit 24 outputs the signal received from comparator 22 as shown in FIG. 9D. When the switch circuit 24 is placed in the terminal 24B position, the switch circuit 24 outputs the signal received from the comparator 3 as shown in FIG. 9B. Thus, the switch circuit 24 outputs the defect signal DF1 as shown in FIG. 9F. As shown in FIG. 9F, in the case of the first type defect of which reflected light is not obtained at all, the defect signal is output in a period from time $t_1$ to time $t_3$. The defect signal corresponds to the real defect portion.

On the other hand, FIGS. 10A to 10F show waveforms of signals of individual portions of the defect detecting circuit in the case of the second type defect of which reflected light weakens in a wide range. In this case, as shown in FIG. 10A, the signal level of the reproduction signal gradually varies. The reproduction signal is supplied to the high-pass filter 21. The high-pass filter 21 extracts high frequency components of the reproduction signal. In the case of the second type defect, since the envelop level of the reproduction signal gradually varies, the edge portions do not contain many high frequency components. Thus, as shown in FIG. 10C, the signal level of the output signal of the high-pass filter 21 does not become large.

The comparator 23 compares the envelop level of the reproduction signal shown in FIG. 10A with the reference level $V_{r2}$. Thus, the comparator 23 outputs a signal as shown in FIG. 10B.

The comparator 22 compares the levels of the high frequency components of the envelop of the reproduction signal extracted by the high-pass filter 21 with the reference level $V_{r1}$. In the case of the second type defect of which reflected light weakens in a wide range, as shown in FIG. 10C, since the signal level of the output signal of the high-pass filter 22 does not almost vary, the comparator 22 outputs a pulse with a narrow pulse width or does not output a pulse.

The pulse width detecting circuit 25 detects the pulse width of the pulse that is output from the comparator 22. When the pulse width of the output signal is $\tau$ or larger, the switch circuit 24 is placed in the terminal 24B position. In the case of the second type defect of which reflected light weakens in a wide range, since the high-pass filter 21 does not output a large signal, the comparator 22 does not output a pulse with the predetermined pulse width or larger as shown in FIG. 10E. Thus, as shown in FIG. 10E, the switch circuit 24 is still placed in the terminal 24A position. Consequently, as shown in FIG. 10F, the defect signal DF1 is not output for a long period.

Figure 11:
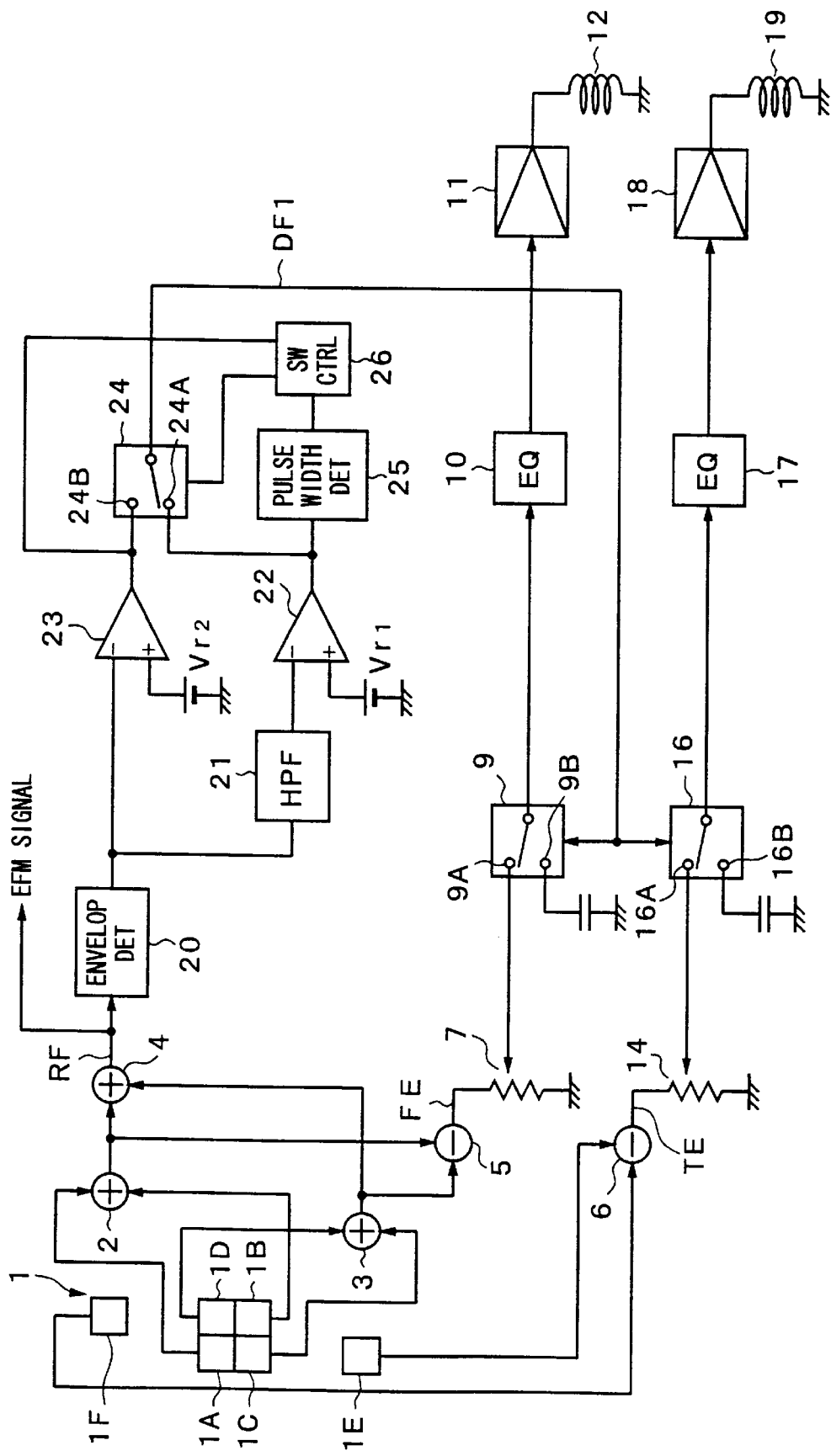
FIG. 11 is a block diagram showing a defect detecting circuit according to a second embodiment of the present invention.

In the above-described example, when the switch circuit 24 outputs the defect signal DF1, the focus servo loop and the tracking servo loop are turned off. With the focus error signal and the tracking error signal that are held in the hold circuits 8 and 15, the focus coil 12 and the tracking coil 19 are driven, respectively. However, as shown in FIG. 11, instead of the hold signal, intermediate levels $V_A$ and $V_B$ may be given.

Figure 12:
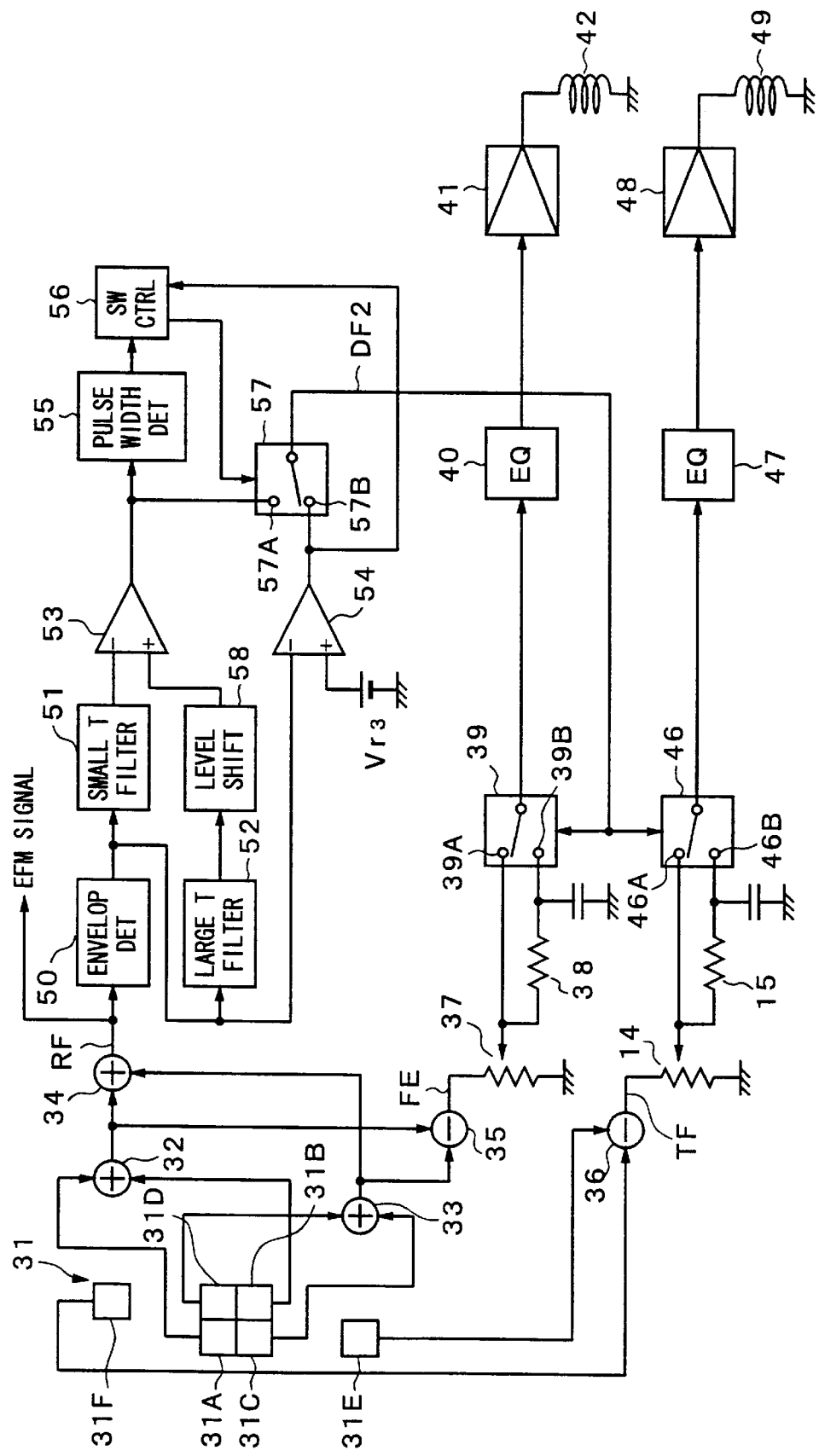
FIG. 12 is a block diagram showing a defect detecting circuit according to a third embodiment of the present invention.

FIG. 12 is a block diagram showing the structure of a defect detecting circuit according to a second embodiment of the present invention. In FIG. 12, output signals of detectors 31A and 31B are supplied to an adder 32. Output signals of detectors 31C and 31D are supplied an adder 33. Output signals of the adders 32 and 33 are supplied to both an adder 34 and a subtracter 35. The adder 34 outputs a reproduction signal RF of the disc. The subtracter 35 outputs a focus error signal FE. Output signals of detectors 31E and 31F are supplied to a subtracter 36. The subtracter 36 outputs a tracking error signal TE.

The focus error signal FE that is output from the subtracter 35 is supplied to a gain adjusting circuit 37. The gain adjusting circuit 37 adjusts the gain of the focus error signal FE. An output signal of the gain adjusting circuit 37 is supplied to both a terminal 39A of a switch circuit 39 and a terminal 39B of a switch circuit 39 through a hold circuit 38. The hold circuit 38 holds the focus error signal FE. An output signal of the switch circuit 39 is supplied to a focus coil 42 through a phase equalizer 40 and a drive amplifier 41. The focus coil 42 moves an objective lens in an optical pickup upwardly and downwardly.

The tracking error signal TE that is output from the subtracter 36 is supplied to a gain adjusting circuit 44. The gain adjusting circuit 44 adjusts the gain of the tracking error signal TE. An output signal of the gain adjusting circuit 44 is supplied to both a terminal 46A of a switch circuit 46 and a terminal 46B of the switch circuit 46 through a hold circuit 45. The hold circuit 45 holds the tracking error signal TE. An output signal of the switch circuit 46 is supplied to a tracking coil 49 through a phase equalizer 47 and a drive amplifier 48. The tracking coil 49 moves the objective lens in the optical pickup in the tracking direction.

The adder 34 outputs an EFM signal. In addition, the adder 34 supplies the reproduction signal RF to an envelop detecting circuit 50. An output signal of the envelop detecting circuit 50 is supplied to both a comparator 54 and filters 51 and 52. The filter 51 has a large time constant, whereas the filter 52 has a small time constant. Output signals of the filters 51 and 52 are supplied to a comparator 53 through a level shifting circuit 58. The comparator 53 compares the output signal of the filter 51 with an output signal of the level shifting circuit 58. The comparator 54 compares the signal level of the reproduction signal with a reference level $V_{r3}$.

An output signal of the comparator 53 is supplied to both a terminal 57A of a switch circuit 57 and a pulse width detecting circuit 56. The pulse width detecting circuit 55 detects whether or not the pulse width of a pulse that is output from the comparator 53 is a predetermined width or larger. An output signal of the pulse width detecting circuit 56 is supplied to a switch controlling circuit 56. An output signal of the switch controlling circuit 56 is supplied as a switch control signal to a switch circuit 57. An output signal of the comparator 54 is supplied to both a terminal 57B of a switch circuit 57 and a switch controlling circuit 56.

In the normal state, the switch circuit 57 is placed in the terminal 57A position. When the pulse width detecting circuit 55 has detected that the pulse width of a pulse that is output from the comparator 53 is the predetermined width or larger, the switch circuit 57 is placed in the terminal 57B position. The switch circuit 57 outputs a defect signal DF2. The defect signal DF2 is supplied as a switch control signal to both the switch circuits 39 and 46.

When the signal level of the defect signal DF2 that is output from the switch circuit 57 is low, the switch circuit 39 is placed in the terminal 39A position. In addition, the switch circuit 46 is placed in the terminal 46A position. When the switch circuit 39 is placed in the terminal 39A position, the focus error signal FE that is output from the subtracter 35 is supplied to the focus coil 42 through the gain adjusting circuit 37, the switch circuit 39, the phase equalizer 40, and the drive amplifier 41. Thus, with the focus error signal FE that is output from the subtracter 37, the focus coil 42 is driven.

When the switch circuit 46 is placed in the terminal 46A position, the tracking error signal TE that is output from the subtracter 36 is supplied to the tracking coil 49 through the gain adjusting circuit 44, the switch circuit 46, the phase equalizer 47, and the drive amplifier 48. Thus, with the tracking error signal TE that is output from the subtracter 6, the tracking coil 49 is driven.

When the signal level of the defect signal that is output from the switch circuit 57 becomes high, the switch circuit 39 is placed in the terminal 39B position. In addition, the switch circuit 46 is placed in the terminal 46B position. When the switch circuit 39 is placed in the terminal 39B position, the focus servo loop is turned off. The focus error signal held in the hold circuit 38 is supplied to the focus coil 42 through the switch circuit 39, the phase equalizer 40, and the drive amplifier 41.

When the switch circuit 46 is placed in the terminal 46B position, the tracking servo loop is turned off. The tracking error signal held in the hold circuit 45 is supplied to the tracking coil 49 through the switch circuit 46, the phase equalizer 47, and the drive amplifier 48.

In this example, the envelop level of the reproduction signal is detected by the filters 51 and 52 that have a small time constant and a large time constant, respectively. The comparator 53 compares the detected value of the filter 51 having the small time constant with the level-shifted value of the detected value of the filter 52 having the large time constant.

The pulse width detecting circuit 55 detects the pulse width of the output signal of the comparator 53. An output signal of the pulse width detecting circuit 55 is supplied to the switch controlling circuit 56. The switch controlling circuit 56 controls the switch circuit 57.

Normally, the switch circuit 57 is placed in the terminal 57A position. When the pulse width detecting circuit 55 has detected a pulse with the predetermined pulse width or larger, the switch circuit 57 is placed in the terminal 57B position. The switch circuit 57 outputs the defect signal DF2.

In the case of the first type defect of which reflected light is not obtained at all as with rubbish that adheres on the disc, since the envelop level of the reproduction signal sharply decreases, the filter 51 having the small time constant outputs a detected signal faster than the filter 52 having the large time constant. Thus, the comparator 53 detects a pulse with the predetermined pulse width or larger. Consequently, the switch circuit 57 is placed in the terminal 57B position. Thus, the switch circuit 57 outputs the defect signal DF2 corresponding to the defect.

On the other hand, in the case of the second type defect of which reflected light weakens in a wide range as with fingerprint that adheres on the disc, the envelop level of the reproduction signal gradually decreases. Thus, the comparator 53 does not output a pulse with the predetermined pulse width or larger. Consequently, the switch circuit 57 is kept in the terminal 57A position. Thus, in the case of the second type defect of which reflected light weakens in a wide range, the defect signal DF2 corresponding to the defect is not output.

According to the second embodiment of the present invention, the focus error signal and the tracking error signal are held corresponding to the defect detection signal of the defect detecting circuit shown in FIG. 12. However, as shown in FIG. 11, the focus error signal and the tracking error signal may be substituted with fixed reference values corresponding to the defect detection signal.

According to the present invention, in the case of the first type defect of which reflected light is not obtained at all as with rubbish that adheres on the disc, the defect signal corresponding to the defect can be obtained. On the other hand, in the case of the second type defect of which reflected light weakens in a wide range as with fingerprint that adheres on the disc, the defect signal corresponding to the defect is not obtained. Thus, just in the case of the first type defect as with rubbish that adheres on the disc, the servo loop is turned on. Consequently, in the case of the second type defect of which reflected light weakens in a wide range as with fingerprint that adheres on the disc, the servo loop can be prevented from being turned off.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A defect detecting circuit for radiating light to an optical record medium and detecting a defect of a reproduction signal generated corresponding to light reflected from the optical record medium, comprising:

first comparing means for comparing a level of the reproduction signal with a first predetermined value and forming a first compared result;

a high-pass filter for extracting a high frequency component from the reproduction signal;

second comparing means for comparing the high frequency component extracted by said high-pass filter with a second predetermined value and forming a second compared result;

time width detecting means for detecting a time width of the second compared result of said second comparing means; and first switching means for selecting the first compared result of said first comparing means or the second compared result of said second comparing means.

2. The defect detecting circuit as set forth in claim 1, further comprising:

holding means for holding a first servo signal at a predetermined timing; and second switching means for selecting a second servo signal or the first servo signal held by said holding means, wherein said second switching means selects one of the first and second servo signals corresponding to an output signal of said first switching means.

3. The defect detecting circuit as set forth in claim 1, further comprising:

fixed voltage generating means for generating a fixed voltage; and second switching means for selecting a servo signal or the fixed voltage generated by said fixed voltage generating means, wherein said second switching means selects one of the servo signal and the fixed voltage corresponding to an output signal of said first switching means.

4. A defect detecting circuit for radiating light to an optical record medium and detecting a defect of a reproduction signal generated corresponding to light reflected from the optical record medium, comprising:

first comparing means for comparing a level of the reproduction signal with a first predetermined value and forming a first compared result;

first detecting means for detecting an envelop of the reproduction signal with a long time constant;

second detecting means for detecting an envelop of the reproduction signal with a shorter time constant than the long time constant;

level shifting means for shifting the level of an output signal of said first detecting means;

second comparing means for comparing an output signal of said level shifting means with an output signal of said second detecting means and forming a second compared result;

time width detecting means for detecting a time width of the second compared result of said second comparing means; and first switching means for selecting the first compared result of said first comparing means or the second compared result of said second comparing means corresponding to an output signal of said time width detecting means.

5. The defect detecting circuit as set forth in claim 4, further comprising:

holding means for holding a first servo signal at a predetermined timing; and second switching means for selecting a second servo signal or the first servo signal held by said holding means, wherein said second switching means selects one of the first and second servo signals corresponding to an output signal of said first switching means.

6. The defect detecting circuit as set forth in claim 4, further comprising:

fixed voltage generating means for generating a fixed voltage; and second switching means for selecting a servo signal or the fixed voltage generated by said fixed voltage generating means, wherein said second switching means selects one of the servo signal and the fixed voltage corresponding to an output signal of said first switching means.

7. A reproducing apparatus, comprising:

reproduction signal generating means for radiating light to an optical record medium and generating a reproduction signal corresponding to light reflected from the optical record medium;

first comparing means for comparing a level of the reproduction signal generated by said reproduction signal generating means with a first predetermined value and forming a first compared result;

a high-pass filter for extracting a high frequency component from the reproduction signal;

second comparing means for comparing the high frequency component extracted by said high-pass filter with a second predetermined value and forming a second compared result;

time width detecting means for detecting a time width of the second compared result of said second comparing means;

first switching means for selecting the first compared result of said first comparing means or the second compared result of said second compared means; and controlling means for controlling various servo loops corresponding to an output signal of said first switching means.

8. The defect detecting circuit as set forth in claim 7, further comprising:

holding means for holding a first servo signal at a predetermined timing; and second switching means for selecting a second servo signal or the first servo signal held by said holding means, wherein said second switching means selects one of the first and second servo signals corresponding to an output signal of said first switching means.

9. The defect detecting circuit as set forth in claim 7, further comprising:

fixed voltage generating means for generating a fixed voltage; and second switching means for selecting a servo signal or the fixed voltage generated by said fixed voltage generating means, wherein said second switching means selects one of the servo signal and the fixed voltage corresponding to an output signal of said first switching means.

10. A reproducing apparatus, comprising:

reproduction signal generating means for radiating light to an optical record medium and generating a reproduction signal corresponding to light reflected from the optical record medium;

first comparing means for comparing a level of the reproduction signal generated by said reproduction generating means with a first predetermined value and forming a first compared result;

first detecting means for detecting an envelop of the reproduction signal generated by said reproduction generating means with a long time constant;

second detecting means for detecting an envelop of the reproduction signal generated by said reproduction generating means with a shorter time constant than the long time constant;

level shifting means for shifting the level of an output signal of said first detecting means;

second comparing means for comparing an output signal of said level shifting means with an output signal of said second detecting means and forming a second compared result;

time width detecting means for detecting a time width of the compared result of said second comparing means;

first switching means for selecting the first compared result of said first comparing means or the second compared result of said second comparing means corresponding to an output signal of said time width detecting means; and controlling means for controlling servo loops corresponding to an output signal of said first switching means.

11. The defect detecting circuit as set forth in claim 10, further comprising:

holding means for holding a first servo signal at a predetermined timing; and second switching means for selecting a second servo signal or the first servo signal held by said holding means, wherein said second switching means selects one of the first and second servo signals corresponding to an output signal of said first switching means.

12. The defect detecting circuit as set forth in claim 10, further comprising:

fixed voltage generating means for generating a fixed voltage; and second switching means for selecting a servo signal or the fixed voltage generated by said fixed voltage generating means, wherein said second switching means selects one of the servo signal and the fixed voltage corresponding to an output signal of said first switching means.

* * * * *